United States Patent
Stoumen et al.

(10) Patent No.: US 6,263,870 B1
(45) Date of Patent: Jul. 24, 2001

(54) SOLAR COLLECTOR INSERT

(76) Inventors: O'Malley O. Stoumen; Jonathan A. Stoumen, both of 614 Johnson St., Healdsburg, CA (US) 95448

( * ) Notice: Subject to any disclaimer, the term of this patent is extended or adjusted under 35 U.S.C. 154(b) by 0 days.

(21) Appl. No.: 09/753,539

(22) Filed: Jan. 2, 2001

(51) Int. Cl.$^7$ ......................................................... F24J 2/36
(52) U.S. Cl. ............................ 126/624; 126/626; 126/675
(58) Field of Search ................................. 126/561–568, 126/624, 569, 648, 702, 704, 675

(56) References Cited

U.S. PATENT DOCUMENTS

| | | | |
|---|---|---|---|
| 3,029,806 | * 4/1962 | Okuda ................................... | 126/626 |
| 3,513,828 | * 5/1970 | Masters ................................. | 126/626 |
| 4,237,860 | * 12/1980 | Caroon ................................. | 126/626 |
| 4,520,793 | * 6/1985 | Hall ...................................... | 126/626 |
| 4,524,757 | * 6/1985 | Buckley .............................. | 126/624 |
| 5,531,217 | * 7/1996 | Louw .................................. | 126/624 |

* cited by examiner

Primary Examiner—James C. Yeung
(74) Attorney, Agent, or Firm—Gowen, Wickersham & Erickson, P. C.

(57) ABSTRACT

A container for holding a liquid having transparent walls and an opening near its upper end, utilizes a heat absorbing insert element within the container comprised of a sheet of flexible black material that can be situated therein so as to expose a relatively large surface area to the sun's rays which pass through the container's transparent walls, thereby increasing the rate of solar heat absorption and rate of heating water within the container.

9 Claims, 3 Drawing Sheets

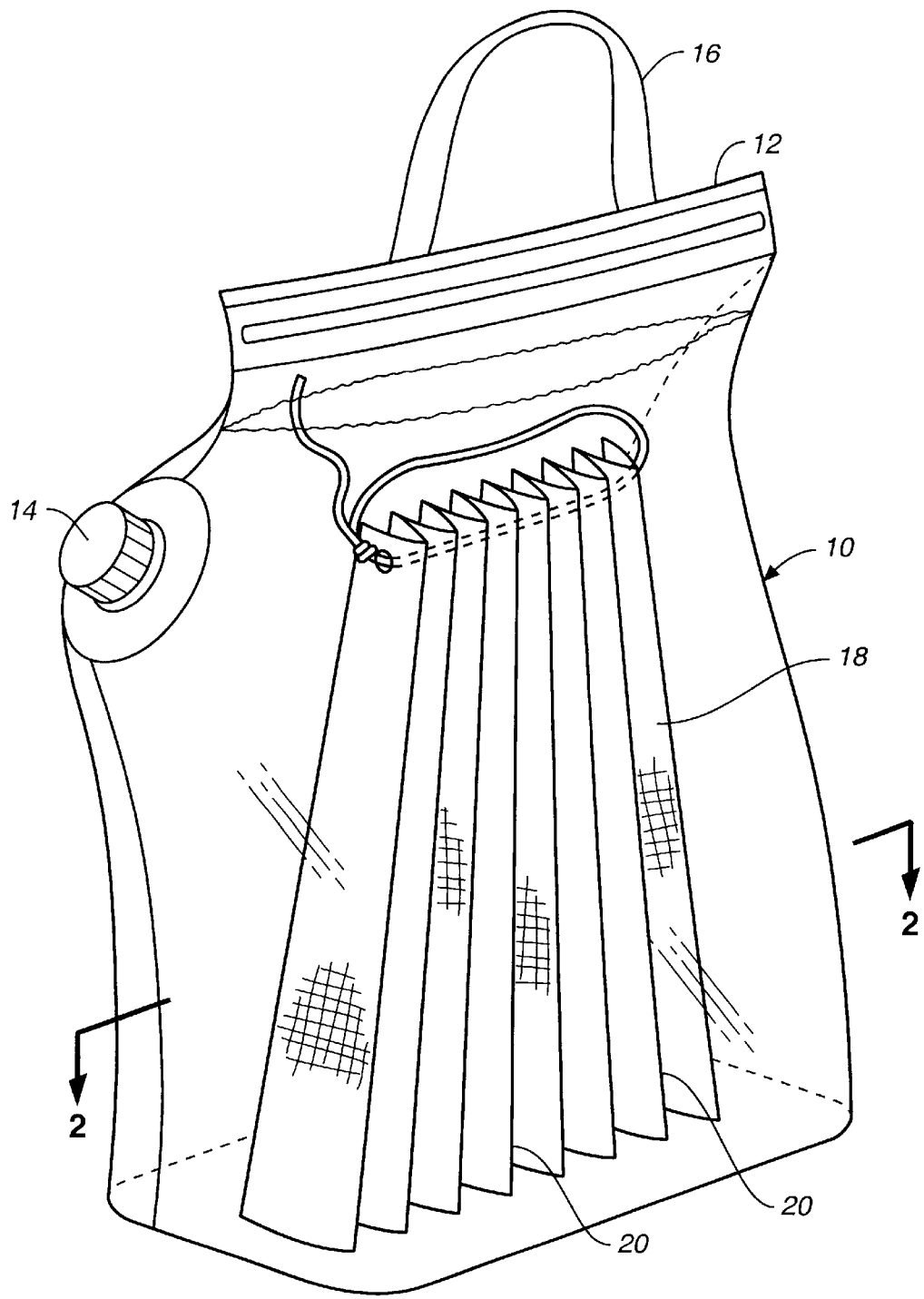
FIG._1

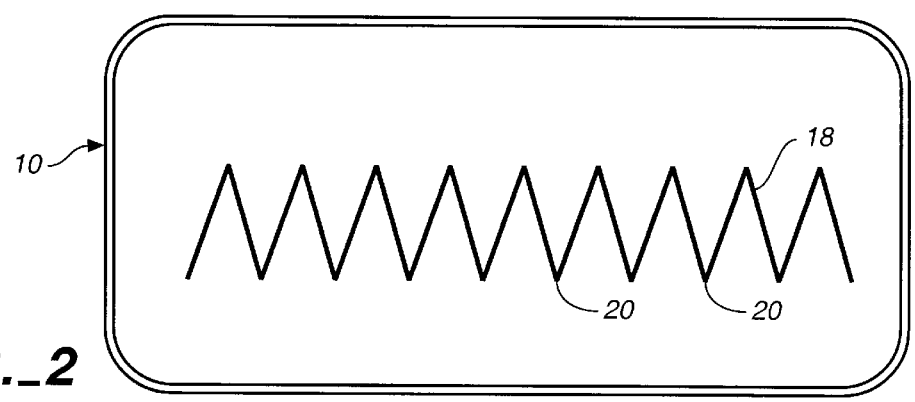
FIG._2
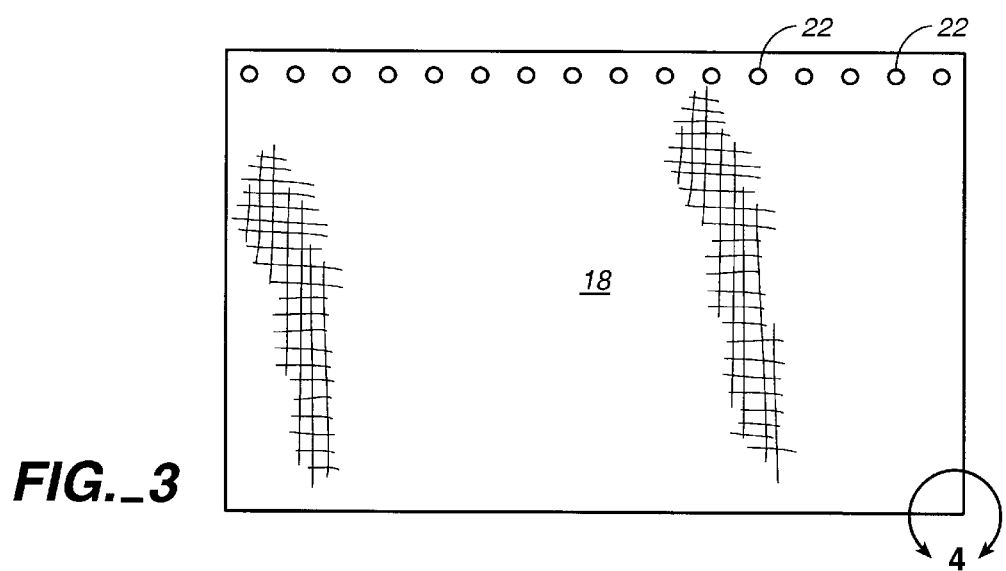
FIG._3
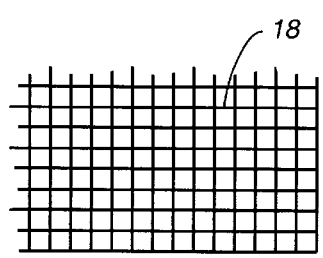
FIG._4
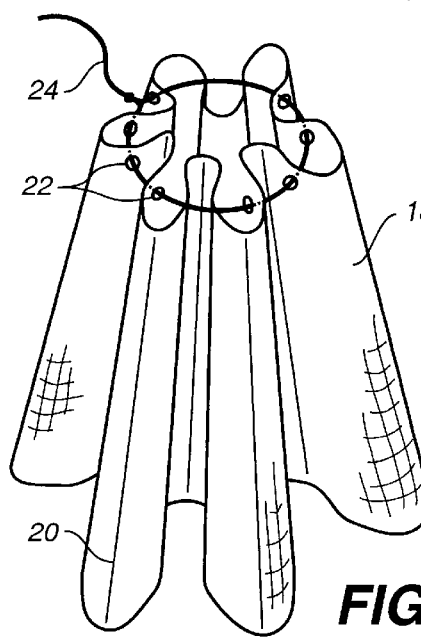
FIG._5

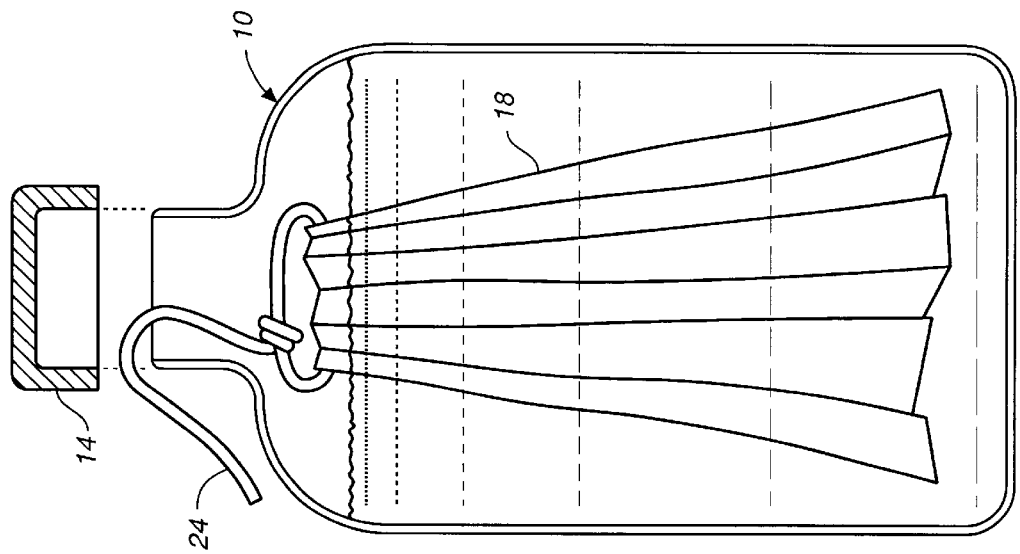
FIG._7
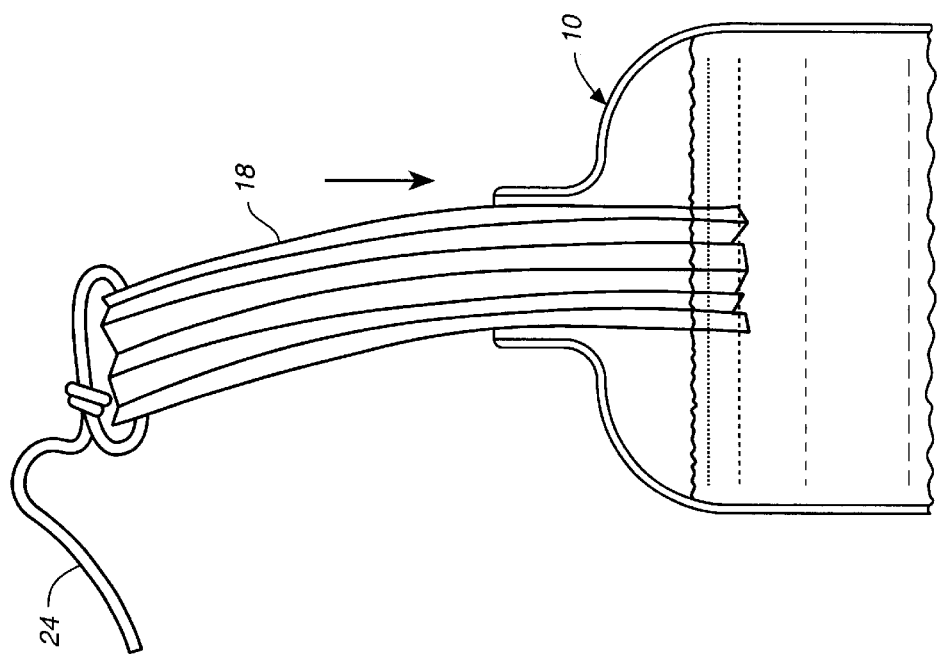
FIG._6

SOLAR COLLECTOR INSERT

FIELD OF THE INVENTION

This invention relates to solar heating devices and more particularly to a device for heating a liquid by solar energy.

BACKGROUND OF THE INVENTION

Backpackers, hikers and the like have a need for warm water for use in cooking, washing and other necessities at a campsite. Fire and stoves are the most common means for heating water, but these require fuel as well as some rigid and often heavy container to hold the water being heated. Using solar energy is often an available means for heating water, but the problem for the backpacker entails providing an appropriate container that can hold water, and yet absorb solar energy in the most efficient manner. A further aspect of the problem of providing a water heater is in providing a container that is sufficiently strong and durable and yet relatively light in weight, as well as compact and thus easy to store and carry. The present invention solves these problems.

In order to increase the rate and efficiency of heat transfer from solar energy to water within a container, the invention contemplates the use of a heat absorbing black body element that is adaptable to be placed within the water filled container. Here, the problem arose of what form of black body element to use and how to insert it into the container so as to be most effective. Again, the present invention solves these problems.

SUMMARY OF THE INVENTION

In accordance with the principles of the invention, a container for holding water is provided having clear walls and made of a suitable transparent material such as a clear plastic or glass. The container has a generally spherical or cylindrical shape with an opening at its upper end that can be closed to retain water when the container is filled when either standing on end or lying flat. A black-body insert for absorbing radiant heat and having a unique shape is provided for insertion into the container through its opening. In one embodiment, the black-body is formed from a flexible material comprised of a multitude of sub-elements that form a mesh or tangled mass that tends to maximize black-body surface area. This form of insert provides the advantages of being shaped for easy passage into the container and once therein, of being expandable to increase black-body surface area. In one embodiment of the invention the black-body insert is prefolded with pleats and once within the container the pleats are spread apart to present a maximum of surface area to the suns rays which pass through the clear walls of the container. The heat absorbing characteristics of the black body insert cause the water within the container to heat more rapidly utilizing only solar energy.

Other objects, advantages and features of the invention will become apparent from the following detailed description presented in conjunction with the accompanying drawing.

BRIEF DESCRIPTION OF THE DRAWING

FIG. 1 is a view in perspective showing a water container with a heat absorbing insert installed therein in accordance of the principles of the invention.

FIG. 2 is a view in section taken along line 2—2 of FIG. 1.

FIG. 3 is a plan view of an unfolded insert for the container of FIG. 1.

FIG. 4 is an enlarged fragmentary view of the insert taken along line 4—4 of FIG. 3 showing its mesh pattern.

FIG. 5 is a view in perspective showing the insert of FIG. 1 outside the container in a stand alone "tee-pee" configuration.

FIG. 6 is a fragmentary view in section showing how the insert can be installed within the clear walled container when initially folded.

FIG. 7 is a view in elevation and in section showing the container with the insert inside and unfolded to expose more surface area.

DETAILED DESCRIPTION OF EMBODIMENT

With reference to the drawing, FIG. 1 shows a typical container 10 used for holding water by hikers, backpackers and the like. Such containers are commercially available and may be provided in various forms. Generally such a container is formed from a transparent material such as glass or a rigid or flexible plastic material which is strong enough so that it will retain a preselected position at rest and be stable when filled. It may have a relatively large opening 12 at its top and a smaller opening 14 at one side with a removable cap 14. A handle 16 may be provided at its upper end.

In accordance with the invention a heat absorbing insert or element 18 is provided within the container when it is filled with water. This insert is of a black material so that it will readily absorb heat from the sun's rays that pass through the transparent container walls. Tests have proven that the rate of heat absorption with the black body element 18 inside the container, and thus the rate of heating the water therein, is greatly increased by its presence.

In one embodiment of the invention the black element 18 is formed from a flexible sheet of mesh or screen material which is chemically inert so that it will not taint or contaminate the water in the container. A mesh material for the element 18 may be of a suitable plastic or polymer material which can withstand, absorb and retain heat up to the temperature of boiling water. The element 18 may be made in mesh, screen, woven or knitted form from polymer or plastic materials such as polyurethanes, silicones, olefins, nylons, polyesters or metals.

In order to increase the heat absorbing characteristics of the insert element 18 within the container 10, the element is formed as a sheet that is folded to form a series of pleats 20, as shown in FIG. 2. As further shown in FIG. 3, the insert sheet 18 is also provided with a series of holes 22 which are spaced apart near its upper edge. As shown in FIGS. 5 to 7, a draw string 24 is laced through the holes 22 so that upper ends of the pleats 20 can be pulled together, thereby enabling the insert element 18 to be more easily installed within the container 10.

In FIG. 5 the element 18 is shown before insertion into a container in a conical or "tee-pee"like configuration with its upper end pulled together by the draw string 24 and the lower ends of the pleats 20 spread outwardly to increase the surface area of the black-body element.

When the container 10 is filled with water and ready for use, the insert element 18 may be installed as shown in FIGS. 6 and 7. The draw string 24 is first pulled tight to bring the pleats 20 together, thereby allowing the insert to be passed through the small container opening 14. When the insert 18 is fully within the container the pleats normally 20 expand at their lower end and fan outwardly to expose more black surface area, as shown in FIG. 6. With the container placed in a location where it receives direct sunlight, the sun's rays are absorbed by the insert, and the heating of the container water takes place at a substantially increased rate. This is a vital advantage to hikers and backpackers at locations where heated water is needed.

To those skilled in the art to which this invention relates, many changes in construction and widely differing embodiments and applications of the invention will make themselves known without departing from the spirit and scope of the invention. The disclosure and the description herein are purely illustrative and are not intended to be in any sense limiting.

What is claimed is:

1. In combination, a container for holding a liquid, said container being formed from a material having transparent walls of sufficient thickness that enable the container to stand upright when filled and having an opening near its upper end, a heat absorbing insert element adapted for installation within said container said insert comprised of a sheet of flexible black material that can be situated within the container to expose a relatively large surface area to the sun's rays which pass through said transparent walls, thereby increasing the rate of solar heat absorption and rate of heating water within the container.

2. The combination of claim 1 wherein said insert is a foldable sheet of black mesh material.

3. The combination of claim 2 wherein said mesh material is made of a flexible plastic material.

4. The combination of claim 2 wherein said sheet of black mesh is provided with a series of spaced apart holes at its upper end, and a draw string extending through said holes for holding the upper end of said insert together so that its lower end will spread apart to expose more surface area.

5. A heat absorbing black-body insert for use in combination with a water container, comprising a flexible sheet of black mesh or screen material having a multiplicity of holes or interstices and foldable into a shape that will allow passage through an opening in the container and expansion when placed within the container so that it will absorb heat, permit convection and raise the temperature of the water within the container when situated in the path of the sun's rays.

6. The black-body insert of claim 5 in the form of a foldable sheet of black mesh material made of plastic material.

7. The black-body insert of claim 5 wherein said sheet of mesh material is provided with means for holding the upper end of said insert together so that its lower end will spread apart to expose more surface area when in the water-filled container.

8. The black-body insert of claim 7 wherein said means for holding comprises a series of spaced apart holes at an upper end and a drawstring extending through said holes.

9. A method for heating water by solar energy comprising the steps of:

a—providing a container having walls of transparent material and an opening at its upper end;

b—installing an insert comprised of flexible black material in a folded condition within said container;

c—causing said folded flexible material to spread apart within the container to expose a larger surface area of heat absorbing material; and d—placing the container with water and said insert therein in an upright position to receive the sun's rays.

* * * * *